June 4, 1935.  L. L. RAYMOND  2,003,976
FISHING BAIT DEVICE
Filed June 29, 1933
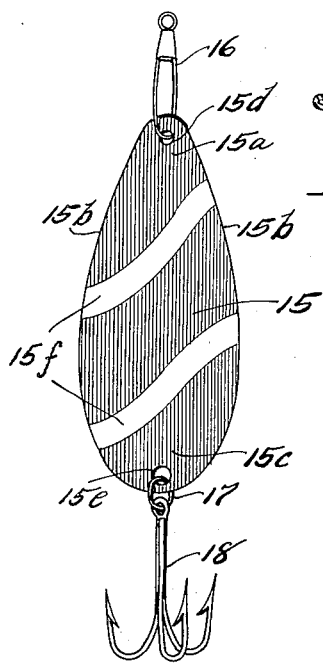
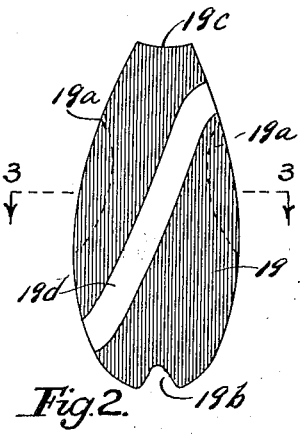
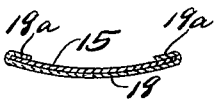
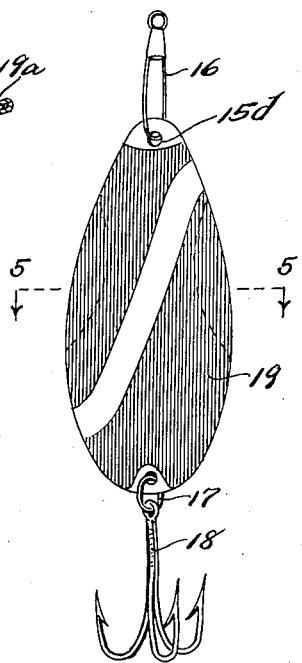
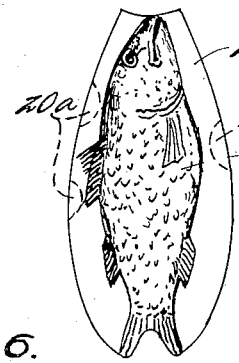
Inventor
Lambert L. Raymond
By Chas. C. Reif.
Attorney Patented June 4, 1935

2,003,976

UNITED STATES PATENT OFFICE 2,003,976

FISHING BAIT DEVICE

Lambert L. Raymond, Minneapolis, Minn.

Application June 29, 1933, Serial No. 678,167

7 Claims. (Cl. 43—45)

This invention relates to a fishing bait, and particularly to such a bait in the form commonly known as a spoon and which comprises a concavo-convex plate having sides converging toward one end. Such spoons are usually of approximate pear shape, the same having attaching means for a line at one end, usually the narrower end, and attaching means for a hook or hooks at the other end. Such spoons commonly have one side, usually the convex side, colored. Various patterns are used and one spoon which has had very large sales of recent years, has said side colored red with a comparatively wide stripe of white extending lengthwise and diagonally of said surface. Fishermen like to have an assortment of baits in their fishing kit and desire to have a plurality of spoons with different colors and patterns thereon. Fish will sometimes strike at a bait of a particular color or pattern when they will not strike at a bait having a different color or pattern.

It is an object of this invention to provide a device or devices whereby a fisherman may have quite an assortment of different colored spoons with various patterns without having to have a plurality of complete spoon baits.

It is a further object of the invention to provide with a spoon one or more thin plate-like members adapted to be readily attached and detached from the spoon, which members are thin and cover one side of the spoon.

It is still another object of the invention to provide in combination with a spoon bait a plurality of thin sheet or plate-like members, each adapted to fit closely against one side of the spoon, the same having means at their converging sides of considerable length adapted to embrace the edge of the spoon and wedge thereagainst so that said member is firmly held on said spoon.

It is more specifically an object of the invention to provide such members as above set forth adapted to fit on the spoon, which members preferably have cut away portions at their top and bottom to clear the attaching means usually present at each end of the spoon, said members also being constructed and arranged to fit against either side of said spoon.

These and other objects and advantages of the invention will be fully set forth in the following description made in connection with the accompanying drawing, in which like reference characters refer to similar parts throughout the several views and in which:—

Fig. 1 is a view in front elevation of a suspended spoon;

Fig. 2 is a plan view of the member adapted to be attached to the spoon;

Fig. 3 is a transverse cross section taken on line 3—3 of Fig. 2 as indicated by the arrows;

Fig. 4 is a view similar to Fig. 1 showing the member shown in Fig. 2 attached to the spoon;

Fig. 5 is a transverse cross section taken on line 5—5 of Fig. 4 as indicated by the arrows;

Figs. 6 and 7 are views similar to Fig. 2 showing members with different patterns thereon;

Fig. 8 is a view similar to Fig. 2 showing a modification;

Fig. 9 is a transverse cross section taken on line 9—9 of Fig. 8 as indicated by the arrows;

Fig. 10 is a view similar to Fig. 5 showing the member of Fig. 8 attached to the convex side of the spoon; and Fig. 11 is a view similar to Fig. 10 showing the member of Fig. 8 attached to the concave side of the spoon.

Referring to the drawing, in Fig. 1 is shown a spoon bait of common type, the same comprising a plate 15 of elongated elliptical or general pear shape having a narrow rounded end 15a toward which the sides or edges 15b converge and having a rear wider rounded end 15c. The end 15a has a small aperture 15d therethrough adapted to receive some suitable attaching means for a fishing line, such as the snap hook 16. The end 15c has centrally therein an aperture 15e through which passes a small ring 17 to which is shown attached the triple hook 18. The spoon 15 is of concavo-convex form as shown by the cross section in Fig. 5. Spoon 15 is shown as having its convex side red with two white diagonal stripes 15f.

In accordance with the present invention a member 19 is provided formed of thin sheet material or metal, the same being of the general shape of spoon 15. Member 19 is of concavo-convex form as shown in Fig. 3 and the same has at its concave side reversely bent flanges 19a which as shown in Fig. 2 are of elongated segmental form. Member 19 has a substantially V-shaped or triangular shaped recess or cut away portion 19b in its wider end and has a slightly concave upper end 19c. Member 19 is shown as having its convex surface red with one white diagonal stripe 19d. Member 19 is adapted to be readily attached to spoon 15 and the same can be slid longitudinally onto spoon 15 from the end 15a thereof, the flanges 19a extending around the sides or edges 15b of spoon 15 and engaging the concave side of spoon 15. The sides of member 19 are substantially coincident with the sides of spoon 15 so that said spoon is substantially covered by member 15. Member 15 is moved down on spoon 15 until the bottoms of the grooves formed by flanges 19a wedge against the sides or edges of the spoon 15. The member 19 is then held firmly in position on spoon 15. Owing to the length of flanges 19a, no sidewise motion of member 19 is permitted and it thus can not oscillate or move from side to side on spoon 15. The bulge or convexity of spoon 15 also acts to prevent any sidewise motion. The recess 19b as shown in Fig. 4 extends about the aperture 15e and ring 17 so that there is no interference with any movement of ring 17 or hook 18. The top edge 19c of member 19 is disposed just below the opening 15d. Should there be any tendency for member 19 to slide toward the end 15a of spoon 15, it would engage the end of snap hook 16 and any appreciable movement would be prevented.

Quite a number of the members 19 will be provided and the same will be preferably sold in sets. These members 19 will be provided with different colors and patterns. When the fisherman wishes to try a spoon of a different color or pattern he will merely select one of the members 19 and slide the same onto the spoon 15 and he will then have a spoon having the color and pattern of the member 19 being used.

In Fig. 6 another member 20 having the same structure as member 19 is shown but the same is provided on its convex side with the representation of a minnow 21. The minnow 21 can be brightly colored and will form an efficient lure. Member 20 is provided with two spaced flanges 20a and a shorter flange 20b at its opposite edge. These flanges will wedge on spoon 15 and prevent sidewise or oscillating movement of member 20.

In Fig. 7 another member 22 is shown having the same structure as member 19 including the flanges 22a, similar to flanges 19a. Member 22 has on its surface the representation of a mouse. As is well known, some fish are fond of mice and such a bait serves as an attractive lure.

In Fig. 8 a member 23 is shown of concavo-convex form and made from thin sheet material or metal, the same being of a size to substantially cover the spoon 15 and having a recess 23a similar to recess 19b and a slightly concave end 23b similar to end 19c. Plate 23 has flanges 23c at either side thereof of elongated segmental form and reversely bent to lie parallel to the concave side thereof. Smaller flanges 23d also of elongated segmental form are cut from flanges 23c and are reversely bent so as to extend substantially parallel to the convex side of member 23. Member 23 is shown as having its upper end yellow with a yellow stripe 23e extending centrally thereof. The flanges 23d are also shown as of yellow color.

In use member 23 can be disposed on spoon 15 and closely fit the same either on the convex or concave side thereof. In Fig. 10 the same is shown applied to the convex side of spoon 15 and in this case flanges 23c engage the concave side of spoon 15. In Fig. 11 member 23 is shown engaging the concave side of spoon 15 and in this case the flanges 23d engage the convex side of said spoon. In either case the flanges 23c or 23d wedge against the sides or edges of spoon 15 and member 23 is held firmly in place just as is member 19 already described.

From the above description it is seen that applicant has provided a very simple and ingenious means by which a fisherman can easily and inexpensively be supplied with a large number of spoon patterns. It will not be necessary for the fisherman to purchase a separate complete spoon for each change of pattern. The plate members of applicant can be easily and inexpensively made and as stated sold in sets. Any one of these can be quickly and easily attached and detached from the spoon. As stated, when attached to the spoon they remain firmly in proper position thereon and the spoon operates in its natural way. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed:—

1. The combination with a fish bait in the form of a spoon of concavo-convex form having sides tapering toward one end, the same having an aperture at said end adapted to receive attaching means and having an aperture at its other end for receiving a hook attaching means, of a thin plate-like member of concavo-convex form adapted to fit on the convex side of said spoon and having its sides substantially coincident with the sides of said spoon, said member having elongated means at opposite sides adapted to wedge against the edges of said spoon and prevent sidewise movement of said member on said spoon, said member having its end portions cut away to clear said attaching means at both ends of said spoon.

2. The combination with a fish bait in the form of a concavo-convex spoon having sides converging toward one end thereof, of a thin plate-like member adapted to fit closely against one side of said spoon and having elongated reversely bent flanges at its converging edges, said flanges extending on both sides of said member whereby it can be readily slid onto said spoon to engage either the convex or the concave side thereof with one set of said flanges wedging against the edges of said spoon and holding the same in place thereon.

3. The combination with a fish bait in the form of a concavo-convex spoon having sides tapering toward one end thereof, of a thin plate-like member shaped to fit closely against one side of said spoon and having its sides substantially coincident with the sides of said spoon, said member having means at its opposite converging edges and disposed at both sides thereof for engaging said spoon and embracing the sides thereof whereby said member can be placed on the concave or convex side of said spoon and be readily attachable or detachable therefrom.

4. The combination with a fish bait in the form of a spoon of concavo-convex form having sides tapering toward one end, the same having an aperture at said end adapted to receive attaching means and having an aperture at its other end for receiving a hook attaching means, of a thin plate-like member of concavo-convex form adapted to fit closely against one side of said spoon and having its sides substantially coincident with the sides of said spoon, said member having elongated reversely bent flanges at its opposite converging sides adapted to embrace and wedge against the sides of said spoon, said member having cut away portions at its ends so as to clear said attaching means and having one end in close proximity to said first mentioned attaching means, whereby said first mentioned attaching means will be engaged in any lengthwise movement of said member and prevent detachment of said member from said spoon.

5. The combination with a spoon bait of concavo-convex form and substantially of spoon shape in plan, of a thin platelike member having different surface treatment than said spoon bait and of substantially the same curvature and size as said spoon bait so as to fit and lie closely against one side thereof, said member having an elongated means along each side at its converging edges adapted to embrace the edge of said spoon bait and wedge thereagainst when moved longitudinally thereof, whereby said member may be readily attached to said spoon bait and detached therefrom merely by a movement longitudinally thereof so that baits with different surface treatments may be formed.

6. The combination with a bait of spoonlike shape in plan and of platelike form, of a member of thin sheet material having different surface treatment than said bait and constructed and arranged to fit closely against the surface of said bait at one side thereof, said member having an elongated means along each side at its converging side portions adapted to embrace the edges of said bait and wedge thereagainst when moved longitudinally thereof to hold said member in position and prevent sidewise movement, whereby said member may be readily attached to said bait and detached therefrom merely by a movement longitudinally thereof so that baits with different surface treatments may be formed.

7. The combination with a spoon bait of concavo-convex form and substantially of a spoon shape in plan, of a thin plate-like member having different surface treatment than said spoon bait and of substantially the same curvature as said spoon bait so as to fit and lie closely against one side thereof, said plate being of a size to cover a large portion of the area of said side, said member having elongated reversely bent flanges along each side at its converging edges adapted to embrace the edge of said spoon bait and wedge thereagainst when moved longitudinally thereof whereby said member may be readily attached to said spoon bait and detached therefrom merely by a movement longitudinally thereof so that baits with different surface treatments may be formed.

LAMBERT L. RAYMOND.